(12) United States Patent
Neumann et al.

(10) Patent No.: US 10,235,582 B2
(45) Date of Patent: Mar. 19, 2019

(54) AUTOMATED EXAMINATION AND PROCESSING OF BIOMETRIC DATA

(71) Applicant: GEMALTO SA, Meudon (FR)

(72) Inventors: Cedric Neumann, Brookings, SD (US); Teresa Wu, Canyon Country, CA (US)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 15/502,759

(22) PCT Filed: Jul. 31, 2015

(86) PCT No.: PCT/US2015/043037
§ 371 (c)(1),
(2) Date: Feb. 8, 2017

(87) PCT Pub. No.: WO2016/022403
PCT Pub. Date: Feb. 11, 2016

(65) Prior Publication Data
US 2017/0236017 A1 Aug. 17, 2017

Related U.S. Application Data

(60) Provisional application No. 62/034,859, filed on Aug. 8, 2014.

(51) Int. Cl.
G06K 9/00 (2006.01)
G06K 9/03 (2006.01)

(52) U.S. Cl.
CPC ......... *G06K 9/00885* (2013.01); *G06K 9/033* (2013.01); *G06K 9/036* (2013.01)

(58) Field of Classification Search
USPC .............. 435/6.12; 382/115, 117, 118, 124
See application file for complete search history.

(56) References Cited

U.S. PATENT DOCUMENTS

| | | | | |
|---|---|---|---|---|
| 8,977,014 B2 * | 3/2015 | Neumann | ............ | G06K 9/6255 382/124 |
| 9,460,333 B2 * | 10/2016 | McNulty | ............ | G06K 9/00033 |
| 9,542,543 B2 * | 1/2017 | Niinuma | ................ | G06F 21/32 |
| 2005/0238210 A1 * | 10/2005 | Sim | .................... | G06K 9/00221 382/118 |

(Continued)

OTHER PUBLICATIONS

Jain, "Biometrics of Next Generation: An Overview," proceedings Second Generation Biometrics Springer. Feb. 2010, 36 pages.

(Continued)

*Primary Examiner* — Xuemei G Chen
(74) *Attorney, Agent, or Firm* — The Jansson Firm; Pehr B. Jansson

(57) ABSTRACT

The present disclosure describes systems and methods for assessing biometric data and determining the type of additional processing required to conclude analysis. In one example, the disclosure describes a computer-implemented method comprising providing biometric data, defining one or more performance parameters, assessing the biometric data for quality of one or more features, wherein the quality includes at least a quantity and correlation between the one or more features, assessing the rarity of the one or more features, and processing the performance parameter, quality, and rarity to guide a determination of a type of additional processing.

18 Claims, 4 Drawing Sheets

(56) References Cited

U.S. PATENT DOCUMENTS

| | | | |
|---|---|---|---|
| 2006/0147094 A1* | 7/2006 | Yoo | G06K 9/00604 382/117 |
| 2006/0182317 A1* | 8/2006 | Neumann | G06K 9/00073 382/124 |
| 2012/0283871 A1* | 11/2012 | Chai | G06F 21/32 700/237 |
| 2013/0086090 A1* | 4/2013 | Partington | G06K 9/00973 707/754 |
| 2013/0236066 A1* | 9/2013 | Shubinsky | G06K 9/00899 382/115 |
| 2014/0152424 A1 | 6/2014 | Steven | |
| 2014/0153791 A1* | 6/2014 | Kim | G06K 9/00046 382/124 |
| 2014/0154686 A1* | 6/2014 | Horton | G01N 1/28 435/6.12 |
| 2015/0110365 A1* | 4/2015 | Ionita | G06K 9/00255 382/118 |
| 2015/0302060 A1* | 10/2015 | Thuillier | G06F 21/32 707/769 |
| 2015/0310252 A1* | 10/2015 | Aoki | G06K 9/00033 382/115 |
| 2016/0063397 A1* | 3/2016 | Ylipaavalniemi | G06N 99/005 706/12 |

OTHER PUBLICATIONS

Murch, "Establishing the Quantitative Basis for Sufficiency Thresholds and Metrics for Friction Ridge Pattern Detail and the Foundation for a Standard," Final Technical Report, National Institute of Justice Award No. 2009-DN-BX-K229, May 2012, 52 pages.

Sankaran, "Automated Clarity and Quality Assessment for Latent Fingerprints," IEEE Sixth International Conference on Biometrics: Theory, Applications and Systems (BTAS), Sep. 2013, 6 pages.

Srihari, "Comparison of ROC and Likelihood Decision Methods in Automatic Fingerprint Verification" International Journal of Pattern Recognition and Artificial Intelligence, May 2008, vol. 22, No. 3, pp. 535-553.

"Standards for Examining Friction Ridge Impressions and Resulting Conclusions (Latent / Tenprint)," Document #10, Scientific Working Group on Friction Ridge Analysis, Study, and Technology, (2013), 16 pages.

Yoon, "On Latent Fingerprint Image Quality," Proceedings of the 5th International Workshop on Computational Forensics, Nov. 2012, 16 pages.

International Search Report for PCT International Application No. PCT/US2015/043037, dated Nov. 9, 2015, 3 pages.

* cited by examiner

AUTOMATED EXAMINATION AND PROCESSING OF BIOMETRIC DATA

CROSS REFERENCE TO RELATED APPLICATIONS

This application is a national stage filing under 35 U.S.C. 371 of PCT/US2015/043037, filed Jul. 31, 2015, which claims the benefit of Provisional Application No. 62/034,859, filed Aug. 8, 2014, the disclosure of which is incorporated by reference in their entirety herein.

TECHNICAL FIELD

The present disclosure relates generally to a computer-implemented method of assessing biometric data and/or to a computer-implemented system for assessing biometric data.

BACKGROUND

Identification of an individual or verifying whether an individual is the person they claim to be is a common problem faced by individuals, businesses, and governments. Sophisticated personal identification methods and systems are often used for security in sensitive government and commercial installations. However, personal identification has potential application wherever a person's identity needs to be identified or verified, such as, for example, the identification of an offender from trace prints recovered at crime scenes or in the control of access to physical locations, such as airports, industrial locations, and in the home. It also has potential application in the control of access to computing and data management equipment and in banking or commercial transactions.

Biometric data is used for personal identification. Biometrics is the study of biological or behavioral phenomena. In the area of personal identification, a chosen biometric characteristic or feature is used to identify or verify a person's identity. In general, biometric identifiers or features are the distinctive, measurable characteristics used to identify and/or describe individuals. Biometric identification is particularly useful as a method of identification because many personal characteristics are substantially unique to each person and are difficult to replicate. Further, the recording and analysis of biometric data can be automated, thereby allowing use of computer controlled electronics and digital recording techniques.

Many types of biometric features are used as identifiers, including, for example, a fingerprint, a palm print, an iris scan, a tattoo image, a facial image, a voice recording, DNA, a vein, and/or an ear image. The following will be discussed largely with respect to fingerprints (including latent prints), but the disclosure is meant to include other types of biometric data embodiments as well.

SUMMARY

For over one hundred years, governments and law enforcement agencies have used fingerprinting techniques to identify individuals. Fingerprints are genetically determined and remain largely unaltered (except in size or injury) throughout the life of an individual. Because fingerprints are unique to each individual and have enduring consistency, fingerprints have become the most common type of biometric identification.

Latent fingerprints or latent prints are, in general, partial or complete fingerprints that are not visible to the naked eye. Analysis of latent prints, including capture and review, is often used to identify perpetrators who may have been involved with or suspected of illegal activity (e.g., a crime). Latent print quality varies greatly from sample to sample. For example, the amount of material deposited (also known as completeness of the impression) during the contact between the finger and the surface, the detection techniques (e.g., optical, chemical, or physical), preservation techniques (e.g., photography, 3D live-scan, lifting, or ink), substrates from which the latent print was lifted, length of time until the latent print is located; and/or environmental conditions (e.g., wet, dry, cold, or hot) all vary between samples.

When processing a latent print to assist in perpetrator identification, a latent print may be processed by an Automated Fingerprint Identification System (AFIS). The AFIS provides an examiner with a user-defined number of potential matches as well as (in some embodiments) a correlation score between the latent print and the fingerprint of each of the potential matches. The examiner then personally assesses the correlation between the latent print and each of the potential match fingerprints. In doing so, the examiner typically identifies, for example, the magnitude, quantity, and types of key features in the latent print. The examiner then assesses each of the potential match fingerprints or samples to determine whether it can be concluded that one of the potential match fingerprints was provided by the same individual as the latent print.

A multi-stage process for comparing collected biometric data to latent print samples is known as Analysis, Comparison, Evaluation, and Verification (ACE-V). ACE-V relies heavily on the expertise of the individual examiner because opinion-based decisions are made at each stage of the process. Decisions concluded in a prior stage impacts the assessment and direction of the following stage. Additionally, the level of documentation and verification involved in latent print assessment varies significantly by individual examiner.

The analysis stage is performed manually by a human examiner. In existing processes, during the analysis stage, observations and determinations are made regarding whether the latent print is suitable for further processing. With respect to existing biometric analysis processes, the term "suitable for further processing" with respect to the analysis stage means that there is adequate quality and quantity of biometric feature data to merit further processing of the latent print. Quantity is defined as the amount or magnitude of features contained within an area of interest identified. Quantity may also be defined as a measurement that is specific to each feature rather than a cumulative or overview metric for all features analyzed in biometric data. Quality is defined as the clarity or how clear the features appear in biometric data.

If an examiner decides that the latent print is not suitable (e.g., the latent print has low quality and low quantity of biometric features) during the analysis stage, no further assessment of the latent print may be conducted. In some embodiments, this decision is reported or documented. If it is concluded that the latent print is suitable during the analysis stage, then further processing will be performed on the identified features. In some embodiments, the biometric features identified in the analysis stage are also documented.

The comparison and evaluation stages are typically affected by the AFIS selected to compare the features and areas of interest of the latent print to one or more existing sample fingerprints. An "area of interest" is defined as a location on the latent print or sample that contains interaction among one or more features. In some AFIS applications, the comparison stage involves a determination of the relationship (e.g., similarities and/or differences) between the features of the latent print and one or more existing sample fingerprints stored physically or electronically. Identification of the one or more existing sample fingerprints may be selected by AFIS or provided through law enforcement investigation. Confirmation of either agreement or disagreement of the relationship among identified features begins the evaluation phase.

During the evaluation phase, the examiner reaches one of the three conclusions based upon the comparative relationship of the latent print and the sample fingerprint. Specifically, the examiner decides if the latent print is (1) from a different source than the sample fingerprint, (2) from the same as the sample fingerprint, or (3) the relationship is inconclusive. These conclusions are further discussed below. Conclusions are affirmed at the discretion of the examiner and may be generally construed as opinions.

Exclusion is an examiner conclusion that the features and area of interest in the compared latent print and one or more existing sample fingerprints are not in agreement and therefore are not from the same source. The sample fingerprint is typically excluded from further consideration.

Individualization is an examiner conclusion that features and areas of interest are from the same source and are probabilistically aligned.

Inconclusive conclusions are assigned by examiners when similar and different features and areas of interest are identified, but not adequately to reach individualization or exclusion.

Examiner documentation generally includes one of the three conclusions, but justification leading to their assignment may not be included.

The final stage, verification, requires that another examiner use the ACE process to analyze the latent print of interest and one or more existing sample fingerprints to attest or contest the conclusion.

To provide an examiner with guidance for conclusion assignment, a representation, termed "sufficiency," is utilized to contrast feature quantity with quality. Sufficiency is generally presented graphically as a visual relation between the quality (e.g., low to high) and quantity of the reviewed feature. As the quality increases, the quantity of the feature required for conclusive identification decreases. The inverse is also true. Conversely, as the quantity increases, the quality of features required for conclusive identification decreases. Sufficiency may also be presented verbally or as a numerical scale to an examiner.

The sufficiency graph provides interrelation guidance between quantity and quality as an examiner moves forward in deciding one of the three conclusions. Also contained on the sufficiency graph are two or more curves that highlight boundaries, which create regions or areas where more or less justification, generally in the form of documentation, may be needed to support the examiner conclusion.

The present inventors recognized that the current decision-making process utilizing the sufficiency graph is manually intensive. Further, the process is open to varied interpretation among examiners, thereby creating risk of inconsistent or erroneous results. The inventors discovered many systems that could improve upon the existing systems by at least one of (1) decreasing the manual nature of the process; (2) increasing consistency in review and/or interpretation; and (3) creating a record of the decision tree. All of these may decrease the incidence of inconsistent or erroneous results.

The present disclosure thus generally relates to automated systems and methods for determining the qualitative and quantitative parameters for feature identification and comparison of biometric data. In some embodiments, the systems and/or methods either decide or assist in deciding how best to examine a latent print. In some embodiments, the systems also or alternatively calculate or permit a user to set an assurance level required to arrive at or corresponding to a designated conclusion. In some embodiments, overall objectivity of the examination process is increased, which may results in improved accuracy, consistency, and transparency. Alternatively or additionally, in some embodiments, at least one of the time and/or cost invested for biometric data assessment is reduced.

One embodiment of this disclosure is directed to a computer-implemented method of assessing biometric data via one or more computers. In some embodiments, the method comprises (1) providing biometric data, (2) defining one or more performance parameters, (3) assessing the biometric data for quality of one or more features, wherein the quality includes at least a quantity and correlation between the one or more features, (4) assessing the rarity of the one or more features, and (5) processing the performance parameter, quality, and rarity to guide a determination of a type of additional processing.

Another embodiment is directed to a computer-implemented system for assessing biometric data comprising one or more processors configured to (1) provide biometric data, (2) define a performance parameter, (3) assess biometric data for quality of one or more features, wherein the quality includes at least the quantity and correlation between the one or more features, (4) assess the rarity of the one or more features; and (5) process the performance parameter, quality, and rarity to guide a determination of type of additional processing.

Another embodiment relates to a computer-readable storage medium that stores computer executable instructions, that when executed, cause one or more processors to (1) provide biometric data, (2) define a performance parameter, (3) assess biometric data for quality of one or more features, wherein the quality includes at least the quantity and correlation between the one or more features, (4) assess the rarity of the one or more features; and (5) process the performance parameter, quality, and rarity to guide a determination of type of additional processing.

BRIEF DESCRIPTION OF DRAWINGS

The following figures provide illustrations of the present disclosure. They are intended to further describe and clarify the present disclosure, but not to limit scope of the present disclosure.

DETAILED DESCRIPTION

Figure 1:
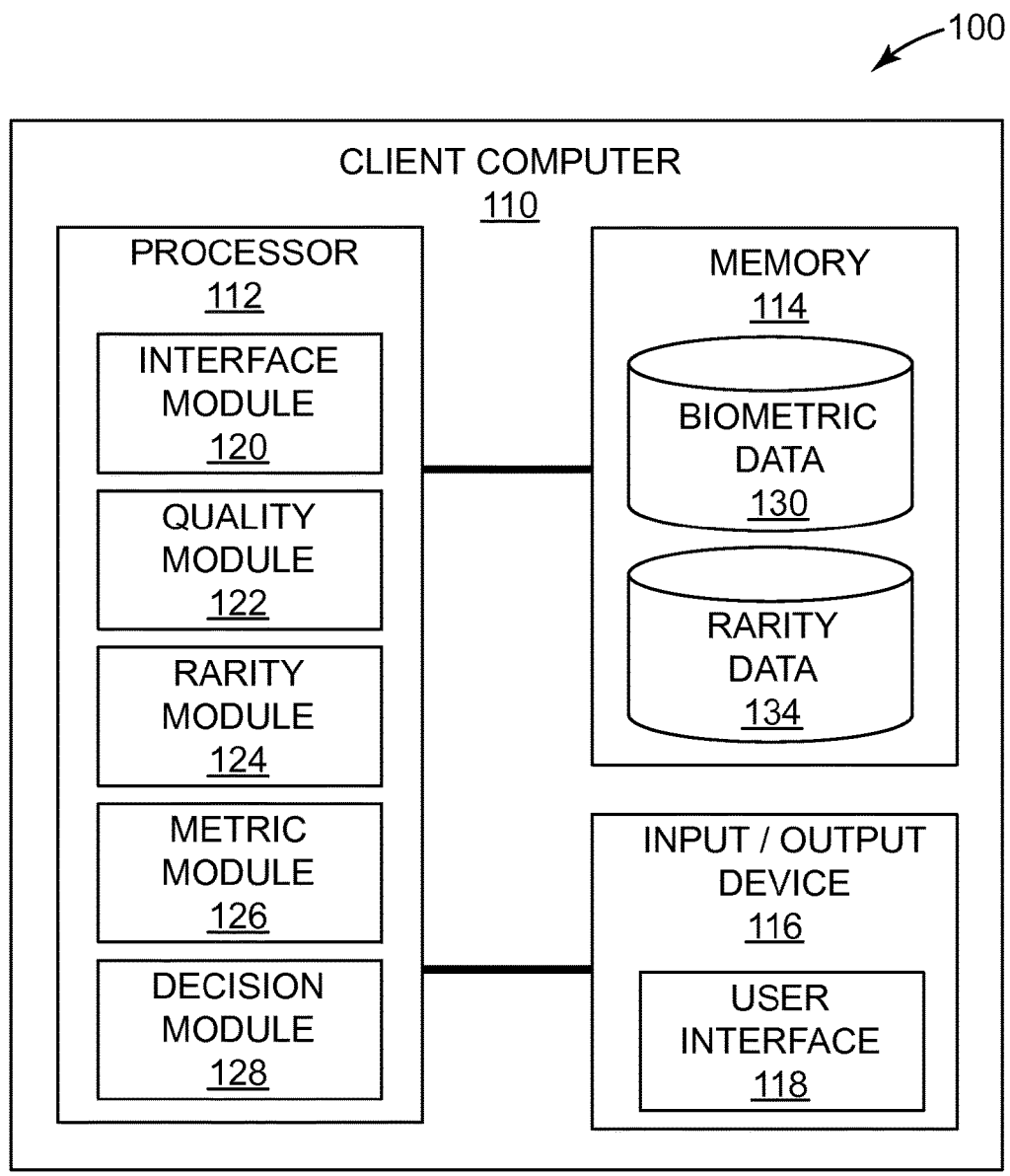
FIG. 1 is a block diagram illustrating an example of a standalone computer system for assessing biometric data.

The present disclosure describes systems and methods capable of assessing biometric data to measure and quantify the relationship among one or more features. Some embodiments are systems capable of automatically deciding and/or directing additional processing if the one or more features are or are not aligned.

Biometric evidence or data is commonly used for security and identification applications. Whether for security or identification, biometric data refers to the information captured to automatically recognize individuals based on biological characteristics. Biometric data may include, but is not limited to: fingerprints, latent fingerprints, palm prints, iris scans, tattoo images, facial images, voice recordings, deoxyribonucleic acid (DNA), and vein and/or an ear images. Although not a biological characteristic, the systems and techniques for assessing biometric data of the present disclosure may be performed on images of tattoos that are present on individuals. Tattoos provide patterns and shapes whose design may be unique to the individual and may be used for identification.

In security applications, biometric data, typically defined as a sample or print, is obtained from an individual at an earlier or a first period of time, stored in a repository or database, and ultimately compared to information captured at a particular location or facility where access may be restricted or regulated at a later or second period of time. If the sample captured at the location matches the data contained in the database, then the individual is permitted entry into the facility. Sample matching may be performed by comparing the print to a previously recorded sample directly or by computing a similarity score.

Identification applications attempt to distinctly verify the identity of an individual by capturing biometric data, such as a latent print either as partial or complete samples, and comparing the information to one or more previously collected and stored samples. Distinction between partial and complete samples is variable and industry experts differ in the definition of the requirements for each. The identification process also involves assigning a quality (such as low, medium, or high) and rarity to the one or more features contained within the biometric data. A process of analyzing and comparing collected biometric data to stored samples is known under the acronym of ACE-V (Analysis, Comparison, Evaluation, and Verification) and is used extensively for fingerprint evidence. ACE-V relies heavily on the education, training, skill, and experience of each individual expert or examiner because opinion-based decisions are made at each stage of the examination process. The objective of ACE-V or any other evaluation process is to determine with a certain degree of probability whether the partial or complete samples match biometric data previously captured and stored to uniquely identify an individual.

Biometric data contain features that are specific to a biological characteristic or tattoo image of interest. Exemplary features specific to biological biometric data or tattoos are summarized in Table 1.

TABLE 1

Features of Biometric Data

| Biometric Data | Features |
| --- | --- |
| Fingerprints, Palm Prints, or Latent Prints | Friction ridges, loops, whorls, arches, edges, minutiae, bifurcations, terminations, ending ridges, pores, dots, spurs, bridges, dots, islands, ponds, lakes, crossovers, scars, warts, creases, incipient edges, open fields, and/or deformations |
| Iris Scan | Rings, furrows, freckles, arching ligaments, ridges, crypts, corona, and/or zigzag collarette |
| Tattoo Images | Patterns, shapes, colors, sizes, shading, and/or texture |
| Facial Images | Peaks between nodal points; valleys between nodal points; position of eyes, nose, cheekbones, or jaw; size of eyes, nose, cheekbones, or jaw; texture, expression, and/or shape of eyes, nose, cheekbones, and/or jaw |
| Voice Recording | The digital signal of the voice, patterns, accents, delivery speed, pitch, volume, inflection, and/or tone |
| DNA | Genome sequences, base pairs, loci, and/or segments |
| Vein Image | Patterns, edges, ridges, dots, and/or a dark lines |
| Ear Image | Edges, ridges, valleys, curves, contours, boundaries between anatomical parts, helices, loubes, tragus, fossa, and/or a concha |

In some embodiments, computer-implement methods and systems are capable of improving and/or automating the analysis of biometric data. Some embodiments of such systems involve, using one or more computers, (1) providing biometric data, (2) defining one or more performance parameters, (3) assessing the biometric data for quality of one or more features, wherein the quality includes at least a quantity and correlation between the one or more features, (4) assessing the rarity of the one or more features, and (5) processing the performance parameter, quality, and rarity to guide a determination of a type of additional processing.

In some embodiments, providing biometric data includes at least one of capture, storage and access. Various systems and techniques may capture biometric data and extract one or more features of interest. They typically include manual techniques or electronic/digital techniques. One exemplary manual technique as ink printing, which involves coating a finger or palm with ink and uniformly creating an impression on a receptive substrate (i.e., paper). The impression may then be digitally scanned and uploaded into a computer for further analysis. Exemplary electronic or digital techniques use optical or infrared readers to automatically capture biometric data. Examples include: iris scanners and two or three dimensional cameras. Techniques that combine manual and electronic/digital techniques are also used for biometric data analysis. As an example, DNA analysis is performed by introducing an enzyme to separate a strand. Base pairs are then replicated and amplified. Automatic analysis is performed to determine how often base pairs repeat in loci or locations on a strand. Once biometric data has been captured it may be stored in memory, a database, or other storage repository.

Some embodiments include performance parameters that may be user defined, specific, and/or customized settings or characteristics that improve or focus the operation of the methods and systems for assessing biometric data. A user may be defined as an examiner, individual, or agency involved in overseeing security, identification, or law enforcement applications. Exemplary performance parameters for assessment of biometric data in the systems and methods described herein include, but are not limited to: 1) the quantity of the features, 2) the rarity of the features, 3) the quality of the features, and 4) the size and type of AFIS database used for analysis. Quantity, rarity, and/or quality may, for example, be indicated as a scalar or range or rating. Accuracy and tolerance settings for scalar or range based performance parameters may be, for example, user or system defined. As an example, if a scalar of '4' is input into a user interface, the system may search for the value of '4' within ±0.5, ±0.3, or ±0.1. Scalar representations may be integers, decimals, or any other numeric designation. Other designations would be apparent to one of skill in the art. For descriptive purposes of this disclosure, scalars are represented as integer values.

Quantity of the features may be assessed in the systems and methods of the present disclosure. In some embodiments, quantity may be indicated as a scalar or range. For example, quantity may be expressed as a range (such as 0-16) where the number represents how many times a feature is present in the biometric data. A larger number implies that the feature appears frequently. In some embodiments, a user may, through a user interface, define or set a range of interest or specify a scalar within the range of interest on which to perform assessment. For example, the user may be interested in assessing friction ridges of a latent print that appear exactly 12 times, greater than 12 times, or less than 12 times. Also, for example, the user may also define ranges of interest within the overall range, such as 5-7, 4-11, or any other combination. Range is defined as the variation from a lower limit (minimum) to an upper limit (maximum). Range may be dependent upon the chosen AFIS or analysis technique and may vary from one system to another or from one system implementation to another.

Rarity of the features may be assessed in the systems and methods of the present disclosure. In some embodiments, rarity may be indicated as a scalar or range. For example, rarity may be indicated as a range (such as 1-10), where the number represents how rare a feature appears in biometric data. In one embodiment, a value of '1' would designate an extremely rare feature where a value of '10' would represent a feature that appears frequently. In another embodiment, a '10' may designate an extremely rare feature, and '1' would represent a less rare feature. In some embodiments, a user may, through a user interface, define or set a range of interest or specify a scalar within the range of interest on which to perform assessment. For example, the user may be interested in only assessing friction ridges of a latent print that are extremely rare and would input a value of '1.' The user may also define ranges of interest within the overall range, such as 5-7, 4-10, or any other combination.

Quality of the features may be assessed in the systems and methods of the present disclosure. In some embodiments, quality may be indicated as a scalar or range. In some examples, quality may be indicated as a range (such as 1-4), where the number represents how clearly a feature appears in a biometric data sample. Clarity may represent how clear a feature appears in the biometric data and whether the feature is not smudged or obscured. For example, low, medium-low, medium-high, and high quality of features in biometric data may be represented as ascending from '1' or descending from '4.' For example, a value of '1' may represent low quality, '2' may represent medium-low quality, '3' may represent medium-high quality, and '4' may represent high quality or vice versa. In some embodiments, a user may, through a user interface, define or set a range of interest or specify a scalar within the range of interest on which to perform the assessment. For example, the user may be interested in only assessing friction ridges of a latent print that are of high quality and would input a value of '4.' The user may also define ranges of interest within the overall range, such as 1-2, 2-3, or any other combination.

In some embodiments, a user may select, for example, through a user interface, the type and size of the AFIS or other analysis system database on which the biometric data assessment will be performed. Selection of the size of analysis system will assist in determining the availability of comparison samples and/or the time required to perform an assessment. For example, a larger size database may increase the accuracy of the analysis, but may extend the amount of time needed to complete. Additionally, database type may impact what features are analyzed and how accurately the features are processed. In some embodiments, selection of the database type and size may be presented in an open text field, a drop-down menu, or as a list for a user to input through the user interface.

In some embodiments, assessing biometric data for quality may include identifying, for example, with one or more computers, the quantity of one or more features that appear in a latent print and/or the clarity of the one or more features. The assessment process may also involve assigning a correlation or resultant score for the feature or features of interest. In some exemplary embodiments, quantity may be processed as a scalar representation. For example, the number of friction ridges that are identified in an area of interest on a latent print may be determined and stored as a designated number (e.g., 1, 2, etc). In some embodiments, clarity may be processed as a textual representation (low, medium, or high) and, in some embodiments, may be converted into a scalar representation. As an example, friction ridges identified in an area of interest on a latent print may be assigned a clarity designation of high and receive a '4' as a scalar representation. In some embodiments, correlation numbers, ratings, or scores may be computed for the identified feature or features. Scores or ratings may be represented as, for example, numerical values, probabilities/ratios, or percentages. For example, the score or rating may be a specific value on a range such as 90 on a scale of 1 to 100, or it may be a represented as a ratio (e.g., the score divided by the maximum value of the range such as 0.9), or as a percentage where the ratio is multiplied by 100% (i.e., 90%).

In some embodiments, assessing the rarity may include, for example, identifying, for example, with one more computers, the prevalence of the feature or features of the biometric data. Assessment includes identifying the one or more features and/or comparing the results with information stored in, for example, a 'rarity' database pertaining to how frequent the one or more features have appeared in previously captured, reviewed, and stored biometric data. In some embodiments, the outcome of the comparison is a numeric designation which indicates how rare the one or more features are with respect to what is known and contained within the rarity database. For example, the size or shape of a friction ridge on a latent print may receive a scalar representation of '10' because the feature is extremely common and is present in numerous samples in the database. In some embodiments, rarity may additionally or alternatively be statistically calculated and assigned to the one or more features before, during, or after comparing the biometric data to information contained in the rarity database. Exemplary statistical calculations may include, but are not limited to: mean, median, variance, standard deviation, first and third quartiles, or percentiles. For example, rare friction ridges contained in an area of interest of a latent print may be converted into an average or mean number for the entirety of the latent print. The mean number may then be compared with statistically calculated information stored in the rarity database.

In some embodiments, processing the performance parameter, quality, and/or rarity may include, for example, with one or more computers, comparing the scalar representations, ranges, and/or scores to guide a determination of a type or amount of additional processing. As a non-limiting example, if quality and rarity are within a first defined range based upon the set performance parameters, the system may process and display the assessment without human intervention (meaning that the system automatically processes the biometric data to reach a conclusion). If quality and rarity are within a second defined range based upon the set performance parameters, the system will process and/or display the assessment with human intervention. In this case, the system will assist and/or prompt the examiner or user to process the information to reach a conclusion. If quality and rarity are within a third defined range based upon the set of performance parameters, the system may terminate assessment of the biometric data. Prior to termination of the assessment, information related to the conclusion may be presented to the user on a display through the user interface.

In some embodiments, processing data to guide a determination of the type of additional processing may also include generating a combined metric or score. The score may also be weighted to favor one or more of quantity, quality, and rarity (or different or additional factors). As a non-limiting example, rarity may be considered more important and may be modified by a multiplier prior to generating the combined metric. The multiplier may assume, for example, a value greater than one. Quality and rarity representations may be summed, subtracted, multiplied, divided, or any combination thereof to generate a resultant score. For example, the quality score (e.g., 0.9) computed for friction ridge may be multiplied with the rarity scalar representation (e.g., '10') to produce a score of '9.' The score or range of scores may be used to determine how (if any) or when additional processing occurs. If a weighted metric is used, then rarity, for example, may be multiplied by a factor of two resulting in a score of '18.' The methods and systems may then use the resultant scores to determine how and if additional processing occurs. For example, if the score is greater than a predetermined value, then assessment of the biometric data may be processed without human intervention. For example, if the score is between two predetermined values, then assessment of the biometric data may be processed with human intervention. For example, if the score is less than a predetermined value, then assessment of the biometric data may be terminated.

Table 2 summarizes some exemplary combination of quality and rarity and resultant scores that decide what additional processing may be performed on the biometric data.

TABLE 2

Additional Processing Decisions

| Description | Decision |
|---|---|
| Quality within 1$^{st}$ Range AND Rarity within 1$^{st}$ Range OR Combined Score Greater Than a Predetermined Value | Process Biometric Data without Human Intervention |
| Quality within 2$^{nd}$ Range AND Rarity within 2$^{nd}$ Range OR Combined Score between two Predetermined Values | Process Biometric Data with Human Intervention |
| Quality within 3$^{rd}$ Range AND Rarity within 3$^{rd}$ Range OR Combined Score Less Than a Predetermined Value | Terminate Assessment of Biometric Data |

In some embodiments, the determination of the amount or level of additional processing may also be dynamic and/or analytic. Dynamic and analytic assessment involves continual adaption and improvement in the determination. In some embodiments, dynamic and/or analytic assessment adaptation and improvement occurs for the first, second, and third ranges and/or combined score predetermined values are assessed. In some embodiments, the methods and systems may provide predictive and/or adaptive operation and/or may shift the ranges or predetermined values to more efficiently or effectively process the biometric data. As a non-limiting example, if the quality and rarity of friction ridges of a latent print is calculated to be within the second ranges and/or the combined score lies between two predetermined values, then the biometric data may be processed with human intervention. However, if during the process of the human intervention, a user concludes that the biometric data may have been processed without human intervention, then the system will modify the first range and combined score settings so that subsequent analyses would be decided without human intervention.

FIG. 1 is a block diagram illustrating an exemplary embodiment of a standalone computer system for assessing biometric data and determining the type of additional processing required to conclude analysis. The system 100 comprises one or more client computers 110 that include one or more processors 112, memory 114, and one or more input/output devices 116, such as, for example a display screen. Client computer 110 may include other components and the functions of any of the illustrated components including computer 110, processor 112, memory 114, and input/output devices 116 may be distributed across multiple components and separate computing devices as illustrated with respect to the distributed computer system of FIG. 2. Client computer 110 may be configured as a workstation, desktop computing device, notebook computer, tablet computer, mobile computing device, or any other suitable computing device or collection of computing devices. The illustrated components are shown merely to explain various aspects of the present disclosure and the addition or removal of components would be apparent to one of skill in the art.

Memory 114 stores information. In some embodiments, memory 114 stores instructions for performing the processes described herein. In some embodiments, memory 114 further includes biometric data 130 and rarity data 134. One or more features from identified biological characteristics or tattoo images are included in biometric data 130. Rarity data 134 contains numeric, textual, or visual (e.g., image) representations of previously analyzed and reviewed one or more features of biometric data. Rarity data 134 may be presented in textual and visual format. As an example, a friction ridge of a previously analyzed latent print may be presented as an image with the rare feature highlighted and identified. In some embodiments, memory 114 is comprised of one or more databases that store biometric data 130 and rarity data 134. Specific features of biometric data 130 and rarity data 134 may also be stored in one or more databases in multiple formats (e.g., text or images). Other methods and configurations of storage may be used to enhance the speed of analysis and/or minimize the overall size of the one or more databases.

Memory 114 may include any volatile or non-volatile storage elements. Examples include random access memory (RAM) such as synchronous dynamic random access memory (SDRAM), read-only memory (ROM), non-volatile random access memory (NVRAM), electrically erasable programmable read-only memory (EEPROM), and FLASH memory. Examples may also include hard-disk, magnetic tape, a magnetic or optical data storage media, a compact disk (CD), a digital versatile disk (DVD), a Blu-ray disk, and a holographic data storage media.

Input/output device 116 may include one or more devices configured to input or output information from or to a user or other device. In some embodiments, input/output device 116 may present a user interface 118 where a user may control the assessment of biometric data and determination of the type of additional processing required to conclude analysis. In some embodiments, user interface 118 may include a display screen for presenting visual information to a user that may or may not be a part of a touch sensitive display. In other embodiments, user interface 118 may include one or more different types of devices for presenting information to a user. User interface 118 may also include any number of visual (e.g., display devices, lights, etc.), audible (e.g., one or more speakers), and/or tactile (e.g., keyboards, touch screens, or mice) feedback devices. In some embodiments, input/output devices 116 may represent both a display screen (e.g., a liquid crystal display or light emitting diode display) and a printer (e.g., a printing device or module for outputting instructions to a printing device). In some embodiments, input/output device 116 may be configured to accept or receive program instructions (e.g., software instructions) that are executed by processor 112 to carry out the techniques described herein. A user may be defined as an individual or agency involved in overseeing security, identification, or law enforcement applications. In some embodiments, user interface 118 may immediately display the results of the assessment of biometric data on a screen or device, display the results of the assessment at a later time, and/or may generate a report to be viewed immediately or at a later time.

Processor 112 may include, for example, one or more general-purpose microprocessors, specially designed processors, application specific integrated circuits (ASIC), field programmable gate arrays (FPGA), a collection of discrete logic, and/or any type of processing device capable of executing the techniques described herein. In some embodiments, processor 112 (or any other processors described herein) may be described as a computing device. In some embodiments, memory 114 may be configured to store program instructions (e.g., software instructions) that are executed by processor 112 to carry out the techniques described herein. In other embodiments, the techniques described herein may be executed by specifically programmed circuitry of processor 112. In some embodiments, processor 112 may thus be configured to execute the techniques for assessing biometric data described herein. Processor 112 (or any other processors described herein) may include one or more processors. In the specific example of FIG. 1, processor 112 further includes interface module 120, quality module 122, rarity module 124, metric module 126, and decision module 128. Processor 112 may also include or exclude components and modules. The components and modules of FIG. 1 are shown as one example, but those of skill in the art would appreciate that other examples may be consistent with the present disclosure. Processor 112 may execute each of the modules 120, 122, 124, 126, and 128 as needed to perform biometric data analyses.

In some embodiments, user interface module 120 may receive input from a user and display input and responses to the input. In some embodiments, user interface module 120 may receive one or more performance parameters and other system settings from a user. Other system settings may include security credentials to access and operate the system or personal preferences to adjust display size or orientation. Other system settings may be contemplated and will be apparent to one of skill in the art. In some embodiments, user interface module 120 may also display an image of the latent print that is currently under examination to a user. A user may, in some embodiments, directly interact with the user interface 120 through the user interface 118 of the input/output device 116. In one embodiment, a user may be presented a drop-down field on the user interface 118 of the input/output device 116 that permits the user to select a scalar for the quantity of features to consider during the assessment of biometric data.

In some embodiments, once the performance parameters and others system settings have been defined in the user interface module 120, the quality module 122 may obtain and analyze one or more features of the latent print of interest. In some embodiments, the latent print may be stored in biometric data 130 of memory 114 and may be accessed by the quality module 122. In some embodiments, quality module 122 may review the latent print and determine the quality and quantity of the one or more features as well as calculate a correlation or score among the one or more features.

In some embodiments, rarity module 124 may analyze, with or without the use of statistics, the rarity or rareness of one or more features contained within the biometric data. In some embodiments, the rarity module 124 compares the features of the latent print to the rarity data 134 that is contained within memory 114. In some embodiments, rarity module 124 may also calculate and assign a scalar representation for the rarity of the one or more features.

In some embodiments, metric module 126 may, based upon quality and/or rarity assessment of the one or more features, combine the representative data into ranges or weighted/non-weighted scores. If quality and/or rarity or favored, the metric module 126 may generate a modifier or multiplier to weight the overall score to compensate for the designated favor.

In some embodiments, decision module 128 may determine the type of additional processing required to conclude analysis. In some embodiments, based upon the ranges or scores obtained from the metric module 126, the decision module 126 may direct the biometric assessment to include human intervention, not include human intervention, or may terminate assessment of the biometric data altogether.

Figure 2:
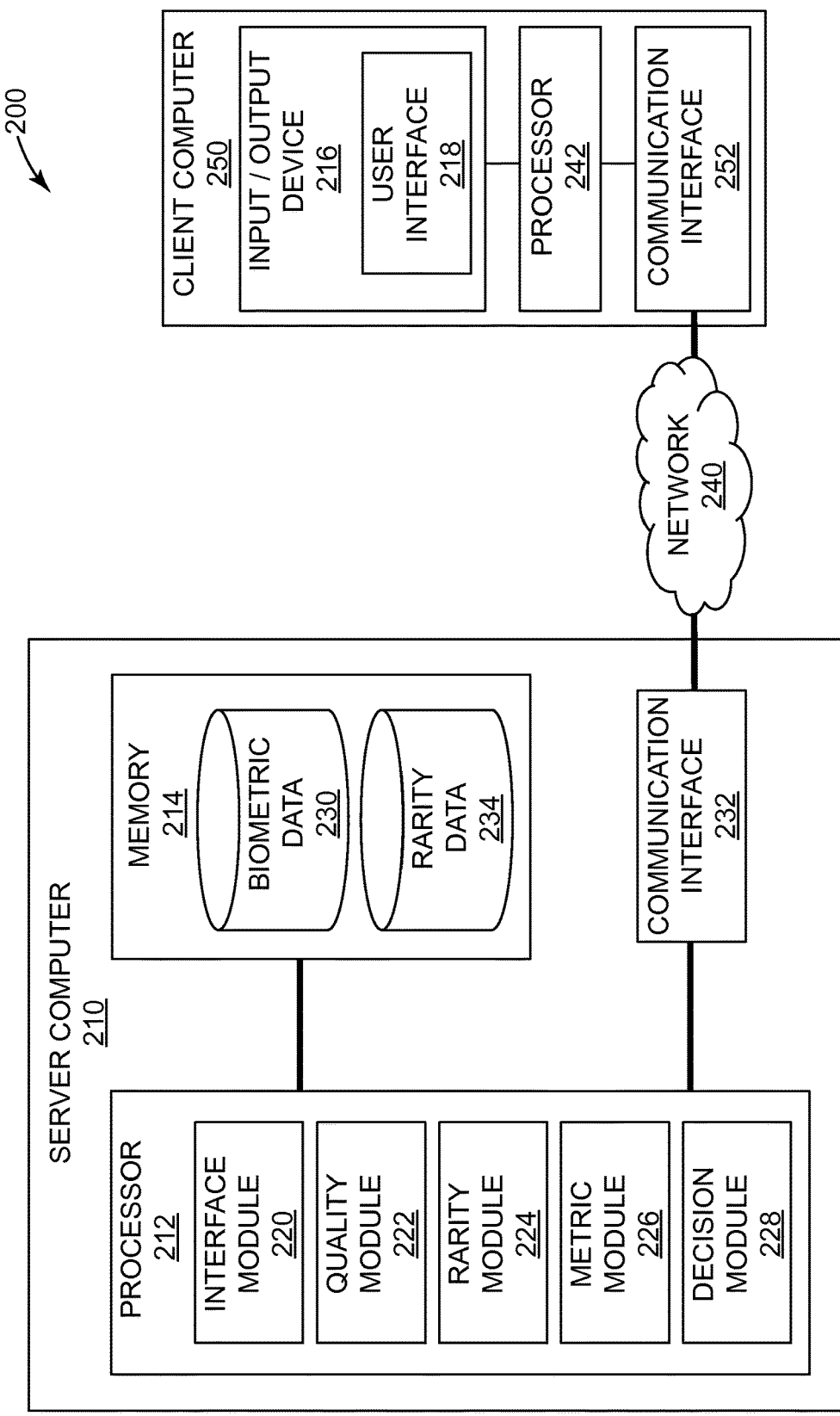
FIG. 2 is a block diagram illustrating an example of a distributed computer system for assessing biometric data.

FIG. 2 is diagram illustrating an exemplary embodiment of a distributed computer system 200 for assessing biometric data and determining the type of additional processing required to conclude analysis. In the embodiment shown in FIG. 2, distributed system 200 may include one or more client computers 250, one or more server computers 210, and a network 240. Client computer 250 may be configured to communicate with server computer 210 through network 240. Server computer 210 may receive requests from client computer 250, retrieve biometric data from memory 214, and perform analysis with processor 212.

In the embodiment of FIG. 2, server computer 210 may be and/or may include one or more computing devices connected to client computer 250 via network 240. Server computer 210 may perform the techniques described herein, and a user may interact with system 200 via client computer 250. Network 240 may include a proprietary or non-proprietary network for packet-based communication. In one embodiment, network 240 may include the Internet, in which case each of client computer 250 and server computer 210 may include communication interfaces for communicating data according to transmission control protocol/internet protocol (TCP/IP), user datagram protocol (UDP), or the like. More generally, however, network 240 may include any type of communication network, and may support wired communication, wireless communication, fiber optic communication, satellite communication, or any type of techniques for transferring data between two or more computing devices (e.g., server computer 210 and client computer 250).

Server computer 210 may be configured to provide a service to one or more clients, such as (1) providing biometric data, (2) defining one or more performance parameters, (3) assessing the biometric data for quality of one or more features, wherein the quality includes at least a quantity and correlation between the one or more features, (4) assessing the rarity of the one or more features; and (5) processing the performance parameter, quality, and rarity to guide a determination of a type of additional processing. In some embodiments, server computer 210 may operate on a local network or be hosted in a Cloud computing environment. Client computer 250 may be a computing device associated with an entity (e.g., a security agency or a police/forensic department) that assesses biometric data. In some embodiments, server computer 210 may also be configured to communicate with multiple client computers 250 associated with the same entity and/or different entities. Examples of client computer 250 include personal computing devices, computers, servers, mobile devices, smart phones, and tablet computing devices.

As shown in FIG. 2, the distributed system 200 comprises one or more server computers 210 that include one or more processors 212, memory 214, and communication interface 232. Server computer 210 may also include many other components and the functions of any of the illustrated components including server computer 210, processor 212, memory 214, and communication interface 232 may be distributed across multiple components and separate computing devices. Server computer 210 may be configured as a workstation, desktop computing device, notebook computer, tablet computer, mobile computing device, server blade, or any other suitable computing device or collection of computing devices. The illustrated components are shown merely to explain various aspects of the present disclosure and the addition or removal of components would be apparent to one of skill in the art.

Server computer 210 may utilize communication interface 232 to communicate with external devices via one or more networks, such as network 240, or other storage devices such as additional repositories over a network or direct connection. Communication interface 232 may be a network interface card, such as an Ethernet card, an optical transceiver, a radio frequency transceiver, or any other type of device that can send and receive information. Other examples of such communication interfaces may include Bluetooth, 3G, 4G, and Wi-Fi radios in mobile computing devices as well as USB. In some examples, server 210 utilizes communication interface 232 to wirelessly communicate with external devices (e.g., client computer 250) such as a mobile computing device, mobile phone, workstation, server, or other networked computing device. As described herein, communication interface 232 may be configured to receive requests, queries, or user input over network 240 as instructed by processor 242 on the client computer 250 through communication interface 252.

Memory 214 stores information. In some embodiments, memory 214 stores instructions for performing the processes described herein. In some embodiments, memory 214 further includes biometric data 230 and rarity data 234. One or more features from identified biological characteristics or tattoo images are included in biometric data 230. Rarity data 234 contains numeric, textual, or visual (e.g., image) representations of previously analyzed and reviewed one or more features of biometric data. Rarity data 234 may be presented in textual and visual format. As an example, a friction ridge of a previously analyzed latent print may be presented as an image with the rare feature highlighted and identified. In some embodiments, memory 214 is comprised of one or more databases that store biometric data 230 and rarity data 234. Specific features of biometric data 230 and rarity data 234 may also be stored in one or more databases in multiple formats (e.g., text or images). Other methods and configurations of storage may be used to enhance the speed of analysis and/or minimize the overall size of the one or more databases.

Memory 214 may include any volatile or non-volatile storage elements. Examples include random access memory (RAM) such as synchronous dynamic random access memory (SDRAM), read-only memory (ROM), non-volatile random access memory (NVRAM), electrically erasable programmable read-only memory (EEPROM), and FLASH memory. Examples may also include hard-disk, magnetic tape, a magnetic or optical data storage media, a compact disk (CD), a digital versatile disk (DVD), a Blu-ray disk, and a holographic data storage media.

In some embodiments, input/output device 216 on client computer 250 may include one or more devices configured to input or output information from or to a user or other device. In some embodiments, input/output device 216 may present a user interface 118 where a user may control the assessment of biometric data and determination of the type of additional processing required to conclude analysis. For example, user interface 218 may include a display screen for presenting visual information to a user that may or may not be a part of a touch sensitive display. In other embodiments, user interface 218 may include one or more different types of devices for presenting information to a user. User interface 218 may also include any number of visual (e.g., display devices, lights, etc.), audible (e.g., one or more speakers), and/or tactile (e.g., keyboards, touch screens, or mice) feedback devices. In some examples, input/output devices 216 may represent both a display screen (e.g., a liquid crystal display or light emitting diode display) and a printer (e.g., a printing device or module for outputting instructions to a printing device). In some embodiments, input/output device 216 may be configured to accept or receive program instructions (e.g., software instructions) that are executed by processor 212 to carry out the techniques described herein. A user may be defined as an individual or agency involved in overseeing security, identification, or law enforcement applications. In some embodiments, user interface 218 may immediately display the results of the assessment of biometric data on a screen or device, display the results of the assessment at a later time, and/or may generate a report to be viewed immediately or at a later time.

Processor 212 may include, for example, one or more general-purpose microprocessors, specially designed processors, application specific integrated circuits (ASIC), field programmable gate arrays (FPGA), a collection of discrete logic, and/or any type of processing device capable of executing the techniques described herein. In some embodiments, processor 212 (or any other processors described herein) may be described as a computing device. In some embodiments, memory 214 may be configured to store program instructions (e.g., software instructions) that are executed by processor 212 to carry out the techniques described herein. In other embodiments, the techniques described herein may be executed by specifically programmed circuitry of processor 212. In some embodiments, processor 212 may thus be configured to execute the techniques for assessing biometric data described herein. Processor 212 (or any other processors described herein) may include one or more processors. In the specific example of FIG. 2, processor 212 further includes interface module 220, quality module 222, rarity module 224, metric module 226, and decision module 228. Processor 212 may also include other components and modules or exclude components and modules. The components of FIG. 2 are shown as one example, but those of skill in the art would appreciate that other examples may be consistent with the present disclosure. Processor 212 may execute each of the modules 220, 222, 224, 226, and 228 as needed to perform biometric data analyses.

User interface module 220 may receive input from a user and display input and responses to the input. User interface module 220 may receive one or more performance parameters and other system settings from a user. Other system settings may include security credentials to access and operate the system or personal preferences to adjust display size or orientation. Other system settings may be contemplated and will be apparent to one of skill in the art. User interface module 220 may also display an image of the latent print that is currently under examination to a user. A user may directly interact with the user interface 220 through the user interface 218 of the input/output device 216. In one example, a user may be presented a drop-down field on the user interface 218 of the input/output device 216 that permits the user to select a scalar for the quantity of features to consider during the assessment of biometric data.

In some embodiments, once the performance parameters and others system settings have been defined in the user interface module 120, the quality module 122 may obtain and analyze one or more features of the latent print of interest. In some embodiments, the latent print may be stored in biometric data 130 of memory 114 and may be accessed by the quality module 122. In some embodiments, quality module 122 may review the latent print and determine the quality and quantity of the one or more features as well as calculate a correlation or score among the one or more features.

In some embodiments, rarity module 124 may analyze, with or without the use of statistics, the rarity or rareness of one or more features contained within the biometric data. In some embodiments, the rarity module 124 compares the features of the latent print to the rarity data 134 that is contained within memory 114. In some embodiments, rarity module 124 may also calculate and assign a scalar representation for the rarity of the one or more features.

In some embodiments, metric module 126 may, based upon quality and/or rarity assessment of the one or more features, combine the representative data into ranges or weighted/non-weighted scores. If quality and/or rarity or favored, the metric module 126 may generate a modifier or multiplier to weight the overall score to compensate for the designated favor.

In some embodiments, decision module 128 may determine the type of additional processing required to conclude analysis. In some embodiments, based upon the ranges or scores obtained from the metric module 126, the decision module 126 may direct the biometric assessment to include human intervention, not include human intervention, or may terminate assessment of the biometric data altogether.

Client computer 250 of FIG. 2 may include input/output device 216, processor 242, and communication interface 252. In some embodiments, client computer 250 may also include many other components. Processor 242 may include one or more general-purpose microprocessors, specially designed processors, application specific integrated circuits (ASIC), field programmable gate arrays (FPGA), a collection of discrete logic, and/or any type of processing device capable of executing the techniques described herein. In some examples, processor 242 or any other processors herein may be described as a computing device. In one example, the techniques described herein may be executed by specifically programmed circuitry of processor 242. Processor 242 may thus be configured to execute the techniques for networking or connecting with the server computer 210 for assessing biometric data and determining the type of additional processing required to conclude analysis described herein.

Client computer 250 may utilize communication interface 252 to communicate with external devices via one or more networks, such as network 240, or other storage devices such as additional repositories over a network or direct connection. Communication interface 252 may be a network interface card, such as an Ethernet card, an optical transceiver, a radio frequency transceiver, or any other type of device that can send and receive information. Other examples of such communication interfaces may include Bluetooth, 3G, 4G, and Wi-Fi radios in mobile computing devices as well as USB. In some embodiments, client computer 250 utilizes communication interface 252 to wirelessly communicate with external devices (e.g., server computer 210) such as a mobile computing device, mobile phone, workstation, server, Cloud based server, or other networked computing device. In some embodiments, communication interface 252 may be configured to generate requests, queries, or send user input over network 240 as instructed by processor 242 to the server computer 210.

Figure 3:
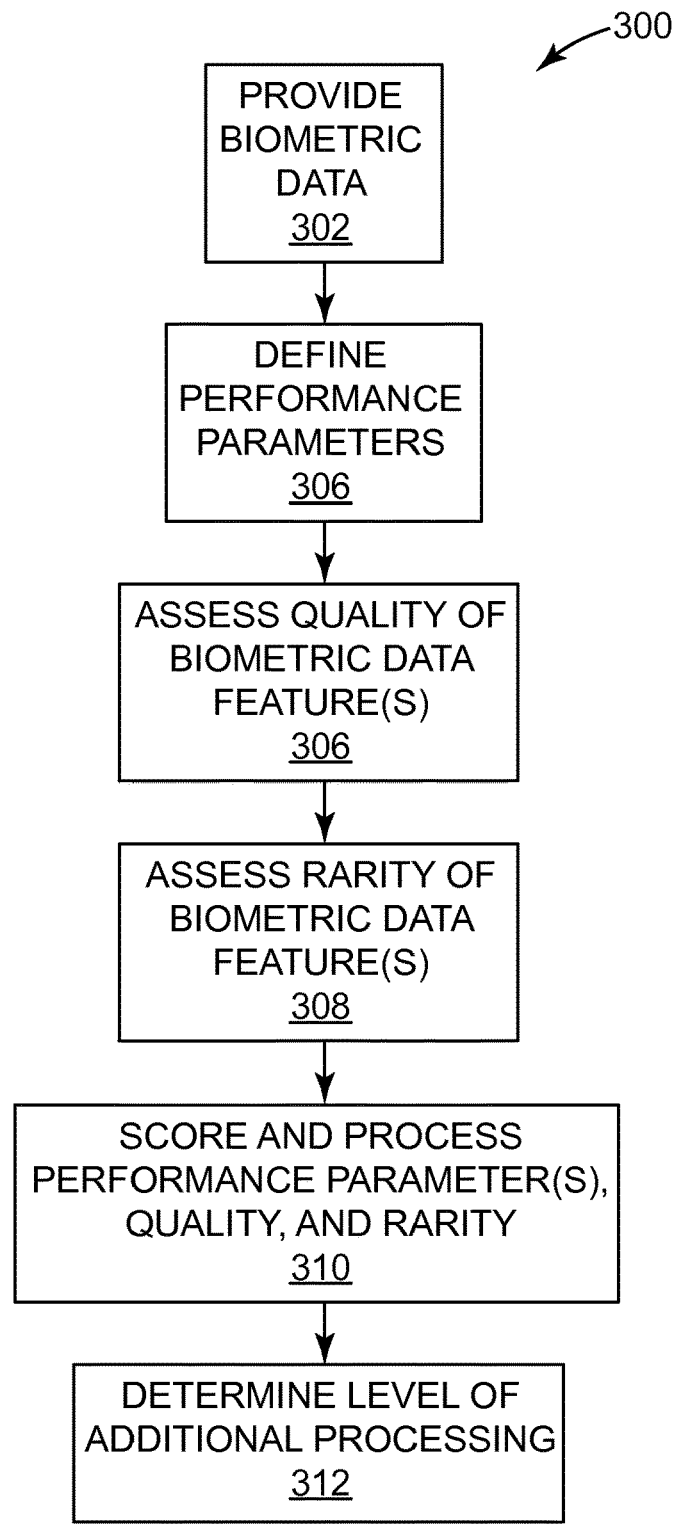
FIG. 3 is a flowchart illustrating an exemplary technique for assessing biometric data.

FIG. 3 is a flowchart illustrating an exemplary technique for assessing biometric data and/or determining type of additional processing to conclude analysis. For clarity, the techniques of FIG. 3 are described with respect to the standalone client computer 110 in FIG. 1, although the techniques are equally applicable to the distributed computer system as described in FIG. 2.

The processor 112 of client computer 110 access memory 114 and stored biometric data 130 to provide biometric data, such as a latent print, and to identify one or more features of interest for processing (302). The user interface 118 receives user input to define performance parameters (304) through the user interface module 120 as to how the system may operate. The feature or features of the biometric data are then assessed to determine quality (306) by the quality module 122. Using rarity data 134 from memory 114 as comparative information, the rarity module 124 assesses the rarity of the one or more features of the biometric data (308). Ranges or combined scores are generated based upon the selected performance parameters, quality, and rarity by the metric module 126 (310). Finally, a determination of the type or level of additional processing is decided (312) by the decision module 128.

Figure 4:
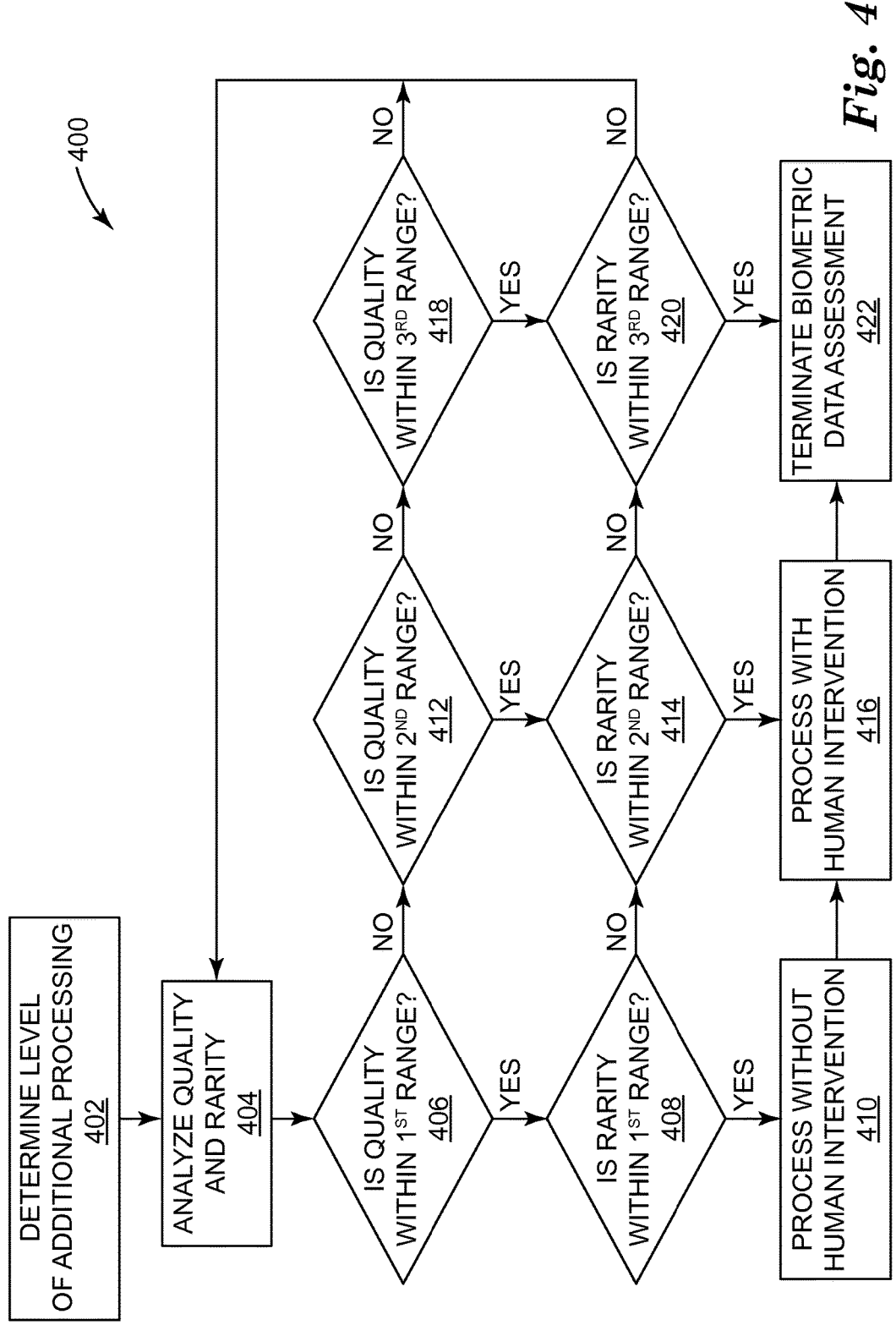
FIG. 4 is a flowchart illustrating an exemplary technique for determining the level of additional processing for biometric data.

FIG. 4 is a flowchart illustrating an example technique for assessing biometric data and determining type of additional processing to conclude analysis. For clarity, the techniques of FIG. 4 are described with respect to the standalone client computer 110 in FIG. 1, although the techniques are equally applicable to the distributed computer system as described in FIG. 2.

The decision module 128 of processor 112 in the client computer 110 determines the type and level of additional processing (402). Quality and rarity ranges are analyzed by the decision module 128 (404). The decision module 128 determines if quality is within a first range (406). If not, the decision module analyzing quality to determine if it is within a second range (412). If quality is within a first range, the decision module 128 determines if rarity is within a first range (408). If quality is within a first range and rarity is within a first range, the decision module concludes that the biometric data and one or more features may be processed without human intervention (410). If rarity is not within a first range, the decision module 128 determines if it is within a second range (414). If quality is within a second range and rarity is within a second range, the decision module 128 concludes that the biometric data may be processed with human intervention (416). If quality is not within the second range, the decision module 128 determines if it is within a third range (418). If it is within the third range, the decision module 128 determines if rarity is within a third range (420). If quality is within a third range and rarity is within a third range, the decision module 128 concludes that the biometric data and one or more features may not be process furthered and terminates assessment (422). If quality is not within a third range and rarity is not within a third range, the decision module 128 returns the assessment to the analyze quality and rarity (404).

The techniques of this disclosure may be implemented in a wide variety of computer devices, such as one or more servers, laptop computers, desktop computers, notebook computers, tablet computers, hand-held computers, smart phones, or any combination thereof. Any components, modules or units have been described to emphasize functional aspects and do not necessarily require realization by one or more different hardware units.

This disclosure contemplates computer-readable storage media comprising instructions to cause a processor to perform any of the functions and techniques described herein. The computer-readable storage media may take the example form of any volatile, non-volatile, magnetic, optical, or electrical media, such as a RAM, ROM, NVRAM, EEPROM, or flash memory that is tangible. The computer-readable storage media may be referred to as non-transitory. A server, client computing device, or any other computing device may also contain a more portable removable memory type to enable easy data transfer or offline data analysis.

The techniques described herein, including those attributed to server computer 210, memory 114 or 214, and/or client computer 110 or 250, and their various constituent components, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, remote servers, remote client devices, or other devices. The term "processor" or "processing circuitry" may generally refer to any of the foregoing logic circuitry, alone or in combination with other logic circuitry, or any other equivalent circuitry.

Such hardware, software, firmware may be implemented within the same device or within separate devices to support the various operations and functions described in this disclosure. For example, any of the techniques or processes described herein may be performed within one device or at least partially distributed amongst two or more devices, such as between server computer 210 and/or client computer 250. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described herein may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Example computer-readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or any other computer readable storage devices or tangible computer readable media. The computer-readable storage medium may also be referred to as storage devices.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache).

The terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The recitation of all numerical ranges by endpoint is meant to include all numbers subsumed within the range (i.e., the range 1 to 10 includes, for example, 1, 1.5, 3.33, and 10).

All references mentioned herein are incorporated by reference in their entirety.

Unless otherwise indicated, all numbers expressing feature sizes, amounts, and physical properties used in the present disclosure and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a", "an", and "the" encompass embodiments having plural referents, unless the content clearly dictates otherwise. As used in this disclosure and the appended claims, the term "or" is generally employed in its sense including "and/or" unless the content clearly dictates otherwise.

Various embodiments and implementation of the present disclosure are disclosed. The disclosed embodiments are presented for purposes of illustration and not limitation. The implementations described above and other implementations are within the scope of the following claims. One skilled in the art will appreciate that the present disclosure can be practiced with embodiments and implementations other than those disclosed. Those having skill in the art will appreciate that many changes may be made to the details of the above-described embodiments and implementations without departing from the underlying principles thereof. It should be understood that this invention is not intended to be unduly limited by the illustrative embodiments and examples set forth herein and that such examples and embodiments are presented by way of example only with the scope of the invention intended to be limited only by the claims set forth herein as follows. Further, various modifications and alterations of the present invention will become apparent to those skilled in the art without departing from the spirit and scope of the present disclosure. The scope of the present application should, therefore, be determined only by the following claims.

Various examples and embodiments have been described herein. Any combination of the described operations or functions is contemplated.

What is claimed is:

1. A computer-implemented method of assessing, in an Automated Biometric Data Identification System, biometric data acquired using various detection techniques or various preservation techniques, said method comprising:
   receiving biometric data in a computer-readable format or transforming biometric data in a computer-readable format;
   defining, by a user, one or more performance parameters corresponding to a designated or expected conclusion and level of assurance;
   assessing at least an area of interest of the computer-readable biometric data for quality of one or more biometric features appearing in the computer-readable biometric data, wherein the area of interest is a location on the computer-readable biometric data that contains interaction among one or more biometric features, and wherein the quality includes at least a quantity of at least one or more biometric features and correlation between the one or more biometric features;
   assessing the rarity of the one or more biometric features; and
   scoring and processing at least one performance parameter, quality, and rarity to define a scalar representation, ranges or scores to guide a determination of a type of additional processing, said guidance being as follows:
   if quality and rarity are within a first defined range based upon the set performance parameters, the system processes and displays the assessment without human intervention to reach a conclusion,
   if quality and rarity are within a second defined range based upon the set performance parameters, the system processes or displays the assessment with human intervention while assisting or prompting a human user to further process the information to reach a conclusion,
   if quality and rarity are within a third defined range based upon the set of performance parameters, the system terminates assessment of the biometric data and displays information related to the termination conclusion to a user through a user interface.

2. The computer-implemented method of claim 1, wherein processing the performance parameter, quality, and rarity comprises creating a combined metric.

3. The computer-implemented method of claim 1, wherein the biometric data is at least one of a fingerprint, a palm print, an iris scan, a tattoo image, a facial image, a voice recording, a latent fingerprint, DNA, a vein, or an ear image.

4. The computer-implemented method of claim 1, wherein the biometric data includes at least one of a fingerprint, latent print, or palm print; and the biometric feature is at least one of friction ridges, loops, whorls, arches, edges, minutiae, bifurcations, terminations, ending ridges, pores, dots, spurs, bridges, dots, islands, ponds, lakes, crossovers, scars, warts, creases, incipient edge, open field, or deformations.

5. The computer-implemented method of claim 1, wherein the biometric data includes an image of a vein, and wherein the biometric feature is at least one of a pattern, an edge, a ridge, a dot, or a dark line.

6. The computer-implemented method of claim 1, wherein the biometric data includes an image of an iris, and wherein the biometric feature is at least one of rings, furrows, freckles, arching ligaments, ridges, crypts, corona, or zigzag collarette.

7. The computer-implemented method of claim 1, wherein the biometric data includes an image of an ear, and wherein the biometric feature is at least one of an edge, a ridge, a valley, a curve, a contour, a boundary between anatomical parts, a helix, a loube, a tragus, a fossa, or a concha.

8. The computer-implemented method of claim 1, wherein the biometric data includes DNA base pairs, and wherein the biometric feature is at least one of a genome sequence, base pairs, loci, or segments.

9. The computer-implemented method of claim 1, wherein the biometric data includes a tattoo, and wherein the biometric feature is at least one of a pattern, a shape, a color, size, shading, or texture.

10. A computer-implemented system, including an Automated Fingerprint Identification System, for assessing biometric data acquired using various detection techniques or various preservation techniques, said computer-implemented system comprising a memory and one or more processors configured to:
    receive biometric data in a computer-readable format or transform biometric data in a computer-readable format;
    define a performance parameter corresponding to a designated or expected conclusion and level of assurance;
    assess at least an area of interest of the computer-readable biometric data for quality of one or more biometric features appearing in the computer-readable biometric data, wherein the area of interest is a location on the computer-readable biometric data that contains interaction among one or more biometric features, and wherein the quality includes at least the quantity and correlation between the one or more biometric features;
    assess the rarity of the one or more biometric features; and
    process the performance parameter, quality, and rarity to guide a determination of type of additional processing to examine the biometric data, said guidance being as follows:
    if quality and rarity are within a first defined range based upon the set performance parameters, the system processes and displays the assessment without human intervention to reach a conclusion,
    if quality and rarity are within a second defined range based upon the set performance parameters, the system processes or displays the assessment with human intervention while assisting or prompting a human user to further process the information to reach a conclusion, if quality and rarity are within a third defined range based upon the set of performance parameters, the system terminates assessment of the biometric data and displays information related to the termination conclusion to a user through a user interface.

11. The computer-implemented system of claim 10, wherein the one or more processors are configured to process the performance parameter, quality, and rarity by creating a combined metric.

12. The computer-implemented system of claim 11, wherein the combined metric is a weighted metric.

13. The computer-implemented system of claim 10, wherein the biometric data is at least one of a fingerprint, a palm print, an iris scan, a tattoo image, a facial image, a voice recording, a latent fingerprint, DNA, a vein, or an ear image.

14. The computer-implemented system of claim 10, wherein the biometric data includes at least one of a fingerprint, latent print, or palm print; and the biometric feature is at least one of friction ridges, loops, whorls, arches, edges, minutiae, bifurcations, terminations, ending ridges, pores, dots, spurs, bridges, dots, islands, ponds, lakes, crossovers, scars, warts, creases, incipient edge, open field, or deformations.

15. The computer-implemented system of claim 10, wherein the biometric data includes an image of a vein, and
wherein the biometric feature is at least one of a pattern, an edge, a ridge, a dot, or a dark line.

16. The computer-implemented system of claim 10, wherein, the biometric data includes an image of an iris, and
wherein the biometric feature is at least one of rings, furrows, freckles, arching ligaments, ridges, crypts, corona, or zigzag collarette.

17. The computer-implemented system of claim 10, wherein the biometric data includes an image of an ear, and
wherein the biometric feature is at least one of an edge, a ridge, a valley, a curve, a contour, a boundary between anatomical parts, a helix, a loube, a tragus, a fossa, or a concha.

18. The computer-implemented system of claim 10, wherein the biometric data includes a facial image, and
wherein the biometric feature is at least one of peaks between nodal points; valleys between nodal points; position of eyes, nose, cheekbones, or jaw; size of eyes, nose, cheekbones, or jaw; texture, expression, or shape of eyes, nose, cheekbones, or jaw.

* * * * *